Figures 1, 2, 3:
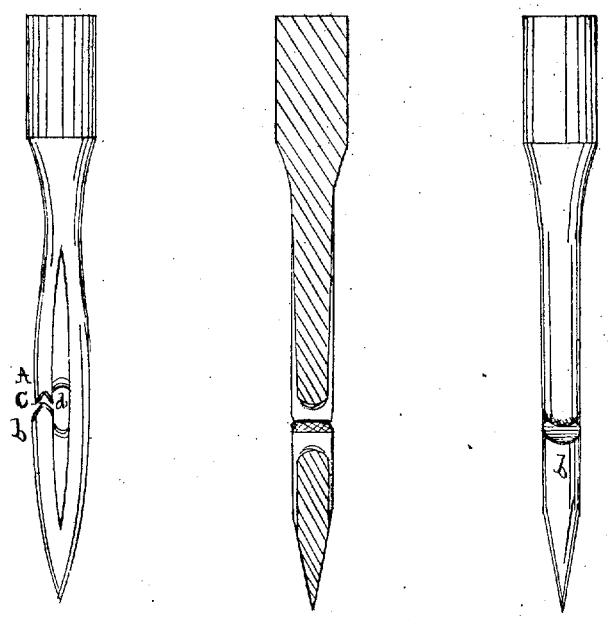

H. G. Suplee,
Sewing Machine.

No. 3818. Reissued Feb. 1. 1870.

Witnesses.
J. J. Noyes.
E. A. Clarkson.

Inventor.
Hannah G. Suplee by W. M. Beadle & Co
attorneys.
Attorneys

UNITED STATES PATENT OFFICE.

HANNAH G. SUPLEE, OF SAN FRANCISCO, CALIFORNIA.

IMPROVEMENT IN NEEDLES FOR SEWING-MACHINES.

Specification forming part of Letters Patent No. 94,924, dated September 14, 1869; Reissue No. 3,818, dated February 1, 1870.

DIVISION A.

*To all whom it may concern:*

Be it known that I, Mrs. HANNAH G. SUPLEE, of the city and county of San Francisco, State of California, did invent a new and useful Improvement in Needles for Sewing-Machines, for which Letters Patent of the United States were granted to me, the said HANNAH G. SUPLEE, bearing date the 14th day of September, 1869, and numbered 94,924; that the said Letters Patent are believed to be inoperative by reason of a defective and insufficient description and specification, which defects and insufficiencies have arisen from inadvertence and mistake, and without any fraudulent intention; and I do hereby declare that the following is a full, clear, and exact description of the same invention, distinguishing it from all other things before known, so as to enable any person skilled in the art or science to which it most nearly appertains to make and use the same without further invention or experiment.

My invention consists in constructing the eye of the needle with a double inverted-V-shaped slot to form the necessary joint, through which the thread may be drawn without the necessity of inserting the end of the thread through the eye, as in the usual way.

In the drawing the figures represent different views of a sewing-machine needle having my improvements.

To enable others skilled in the art to make and use my invention, I will proceed to describe fully its construction and operation.

A represents the slot or opening, which in form resembles an inverted double V, which is cut obliquely through one side of the eye of the needle, about midway, with the points or inner vertex rounded, so that no acute angles will appear to cut the cloth when it is passing through. At the side of the eye of the needle, immediately below the slot, is a projection, *b*, which extends a little beyond the part of the eye above the slot, so that as the needle enters the fabric the part or point *c* of the upper part of the slot will not engage or catch the cloth; also, the needle is withdrawn from the stitch without lifting the fabric, or any perceptible difference in its operation from that of the ordinary needle, yet the perforations of my needle in the cloth will be a little larger, but will not prevent the finest stitch from being made. The slot is made obliquely to more effectually prevent the thread from being carried out of the eye in its operation. The upper lip or point of the slot may extend nearer the shoulders or lower lip of the slot, according to the size of the needle and the thread employed.

Thus it will be clearly seen that my needle may be threaded by persons having poor eye-sight, or even in the dark, by simply taking the thread between the fingers of both hands and raising it up to the depression of the slot and carrying it over the center or inner point and down the opposite incline or radii to the eye of the needle.

Having thus described my invention, what I claim as new, and desire to secure by Letters Patent, is—

The within-described needle for sewing-machines, having a slot or opening, A, from the eye, with points *c d* and projection *b*, substantially as and for the purpose set forth.

In testimony whereof I have hereunto set my hand and seal.

HANNAH G. SUPLEE. [L. S.]

Witnesses:
C. W. M. SMITH,
A. H. RAPP.